Patented Nov. 21, 1950

2,530,661

UNITED STATES PATENT OFFICE 2,530,661

RECOVERY OF ETHYL CHLORIDE

Carl B. Linn, Riverside, Ill., assignor to Universal Oil Products Company, Chicago, Ill., a corporation of Delaware No Drawing. Application May 31, 1946, Serial No. 673,609

4 Claims. (Cl. 260—652)

This invention relates to the recovery of ethyl chloride from saturated hydrocarbon mixtures containing this alkyl halide.

An object of this invention is to separate and recover ethyl chloride from a low boiling paraffinic hydrocarbon material containing this alkyl halide.

Another object of this invention is to separate and recover ethyl chloride from a butane fraction containing a minor proportion of ethyl chloride.

One specific embodiment of the present invention relates to a process which comprises contacting a hydrocarbon fraction containing ethyl chloride with chlorosulfonic acid to dissolve said ethyl chloride therein, separating the solution of ethyl chloride in chlorosulfonic acid from the treated hydrocarbon fraction, and distilling said solution to separate ethyl chloride therefrom.

Ethyl chloride has been used in small quantities as a promoter for certain reactions such as the isomerization of normal butane into isobutane in the presence of a metal chloride catalyst. Although desirable, the recovery of this ethyl chloride for recycling purposes has heretofore been difficult. It is an object of this invention to scrub ethyl chloride from a refinery stock and subsequently to recover the ethyl chloride.

Chlorosulfonic acid utilizable in separating alkyl halides and particularly ethyl chloride from saturated hydrocarbons may be obtained from any source. One method of preparing chlorosulfonic acid consists in passing anhydrous hydrogen chloride into fuming sulfuric acid (80% SO₃) until hydrogen chloride is no longer absorbed. The resultant product upon being subjected to fractional distillation loses some hydrogen chloride and then chlorosulfonic acid distills over at a temperature between 150° and 165° C. Chlorosulfonic acid is also obtained by the direct union of hydrogen chloride and sulfur trioxide, by the action of chlorine or sulfur chloride upon concentrated sulfuric acid, by the action of sulfuric acid on thionyl chloride, by the action of a little water or concentrated sulfuric acid on sulfuryl chloride, and by the action of imperfectly dried chlorine on moist sulfur dioxide in the presence of platinum black at a red heat.

My process for recovering ethyl chloride from a hydrocarbon or hydrocarbon mixture containing this alkyl halide may be carried out using either batch or continuous types of operation. In a typical continuous operation, a hydrocarbon fraction, such as normal butane, containing ethyl chloride and chlorosulfonic acid are charged to a suitable contacting zone, such as a baffled mixer or a reactor provided with a stirring means. The chlorosulfonic acid upon contacting the hydrocarbon or hydrocarbon mixture, preferably at a temperature of from about —40° to about 30° C., dissolves therefrom a substantial proportion of the ethyl chloride. The resultant solution is withdrawn from the contacting zone to a separating zone which comprises settling equipment in which the heavier chlorosulfonic acid containing dissolved ethyl chloride separates as a lower layer from the treated hydrocarbon fraction which comprises the upper layer. The hydrocarbon fraction may then be washed, dried, and directed to any desired use. The chlorosulfonic acid layer is directed from the separate zone to a distilling and fractionating zone in which the ethyl chloride is separated from the chlorosulfonic acid. The recovered ethyl chloride may then be recycled to further use as a promoter in butane isomerization or employed otherwise as desired. The chlorosulfonic acid from which the ethyl chloride is separated is suitable for recycling in this process to separate additional quantities of ethyl chloride from the ethyl chloride-hydrocarbon mixture charged to the process. Although the removal of ethyl chloride from the ethyl chloride-chlorosulfonic acid solution may be carried out at atmospheric pressure, it is preferable to do this at subatmospheric pressure, and at a temperature of from about 0° to about 80° C. in order to avoid excessive heating of the chlorosulfonic acid, since the first step of the process is carried out more advantageously at a relatively low temperature. If the chlorosulfonic acid is heated to separate ethyl chloride therefrom, the recovered chlorosulfonic acid is cooled before being recycled to the first step of this process.

My process is also applicable to the separation of ethyl chloride from gaseous paraffin hydrocarbons in a mixture such as that resulting from the chlorination of paraffins. Thus the chlorination of ethane and the recovery of the resultant ethyl chloride from the excess of ethane may be represented by the following equations:

$$C_2H_6 + Cl_2 \rightarrow C_2H_5Cl + HCl$$
$$C_2H_6 + C_2H_5Cl + ClSO_3H \rightarrow$$
$$C_2H_6 + \text{Soln. of } C_2H_5Cl \text{ in } ClSO_3H$$

The following data are given to illustrate the type of results obtained in this process although this example is not introduced with the intention of restricting unduly the generally broad scope of the invention.

Ethyl chloride (58 grams) was passed rapidly into 354 grams of chlorosulfonic acid contained in a gas washing bottle surrounded by an ice bath. The absorption of ethyl chloride was complete during a time of 30 minutes without noticeable heat evolution. The resultant solution of ethyl chloride dissolved in chlorosulfonic acid was then placed in a distilling flask and heated to 50° C. at a pressure of 190 mm. of mercury. In this operation 90% of the ethyl chloride (52 grams) was recovered and this yield could have been increased by using a higher temperature distillation and/or a lower pressure.

The nature of the present invention and its utility are evident from the preceding specification and example, although neither section is intended to limit unduly the generally broad scope of the invention.

I claim as my invention:

1. A process for separating ethyl chloride from a mixture comprising essentially saturated hydrocarbons and ethyl chloride which comprises contacting said mixture with chlorosulfonic acid to dissolve therein said ethyl chloride, separating the solution of ethyl chloride in chlorosulfonic acid from the treated hydrocarbons, and distilling said solution to separate ethyl chloride therefrom.

2. A process for separating ethyl chloride from a mixture comprising essentially saturated hydrocarbons and ethyl chloride which comprises contacting said mixture with chlorosulfonic acid at a temperature of from about −40° to about 30° C. to dissolve therein said ethyl chloride, separating said solution of ethyl chloride in chlorosulfonic acid from the treated hydrocarbons, and distilling said solution at a subatmospheric pressure to separate ethyl chloride therein.

3. A process for separating ethyl chloride from a mixture comprising essentially saturated hydrocarbons and ethyl chloride which comprises contacting said mixture with chlorosulfonic acid at a temperature of from about −40° to about 30° C. to dissolve therein said ethyl chloride, separating said solution of ethyl chloride in chlorosulfonic acid from the treated hydrocarbons, and distilling said solution at a subatmospheric pressure at a temperature of from about 0° to about 80° C.

4. A process for separating a mixture of ethyl chloride and butane which comprises contacting said mixture with chlorosulfonic acid at a temperature of from about −40° to about 30° C. to dissolve therein said ethyl chloride, separating said solution of ethyl chloride in chlorosulfonic acid from the treated butane, and distilling said solution at a subatmospheric pressure at a temperature of from about 0° to about 80° C.

CARL B. LINN.

REFERENCES CITED

The following references are of record in the file of this patent:

UNITED STATES PATENTS

| Number | Name | Date |
| --- | --- | --- |
| 1,470,656 | Traube | Oct. 16, 1923 |
| 2,275,151 | Kimberlin | Mar. 3, 1942 |